J. V. B. FRANCE.
Seeder, Roller and Drag.
No. 97,380.
Patented Nov. 30, 1869.
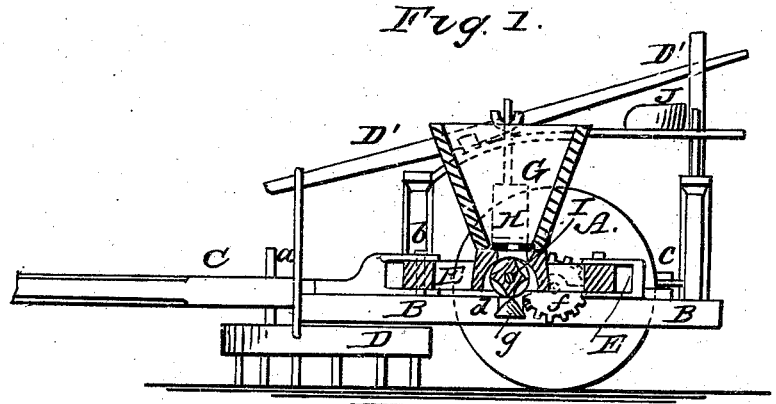
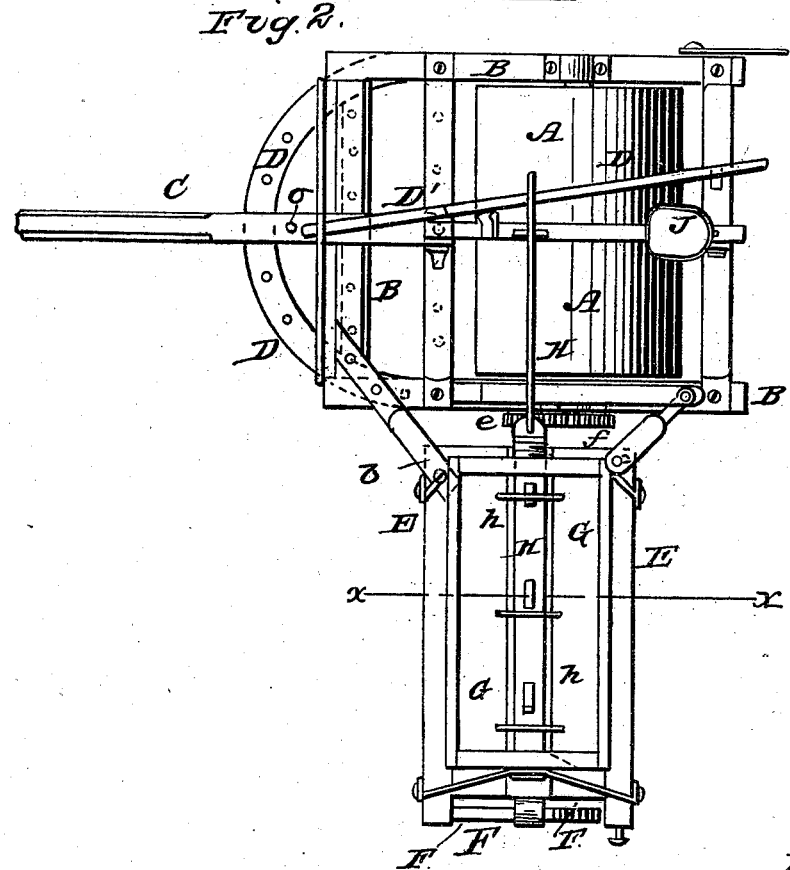

United States Patent Office.

JOHN V. B. FRANCE, OF BOSCOBEL, WISCONSIN.

Letters Patent No. 97,380, dated November 30, 1869.

---

IMPROVEMENT IN COMBINED SEEDER, ROLLER, AND DRAG.

---

The Schedule referred to in these Letters Patent and making part of the same.

---

*To all whom it may concern:*

Be it known that I, JOHN V. B. FRANCE, of Boscobel, in the county of Grant, and State of Wisconsin, have invented a new and improved Combined Seeder, Roller, and Drag; and I do hereby declare that the following is a full, clear, and exact description thereof, which will enable others skilled in the art to make and use the same, reference being had to the accompanying drawing, forming part of this specification, in which—

Figure 1 represents a vertical transverse section of my combined roller, seeder, and drag, the plane of section being indicated by the line x x, fig. 2.

Figure 2 is a plan or top view of the same.

Similar letters of reference indicate corresponding parts.

This invention relates to a new agricultural implement, which is so constructed that it will serve to scatter the seed on the ground and to work the same into the soil, all by one operation.

The invention consists chiefly in the combination with each other of a seeding-machine, roller, and drag; also in a novel arrangement of seeding-mechanism; and finally, in a new manner of attaching the frame of the seeder to that of the roller, so that the former can be swung out of the way when the machine is to be conveyed from one place to another.

A, in the drawing, represents a roller of ordinary or suitable construction.

It has its bearings in a frame, B, which has a projecting tongue C, so that it can be drawn over the ground in the usual manner.

D represents a harrow or drag made on a semi-circular frame, and suspended from a lever, D', which is pivoted to the frame B, and by means of which the drag can be raised or lowered at will.

From the frame of the drag project pins $a$ $a$ through the frame B, to insure vertical motion of the drag during adjustment, and a consequent horizontal position.

E is a frame, which is by two bolts, $b$ and $c$, fastened to the left-hand side of the frame B, and which, on the outer end, is supported by a caster-wheel, F.

On this frame E is arranged a seed-box or hopper, G, which has a perforated sliding bottom, H, above a fixed perforated bottom, $h$, and under which a revolving shaft, I, is longitudinally fitted.

The shaft I carries a series of seed-droppers, $d$ $d$, which are disks or cylinders provided with recesses or seed-receptacles, one such seed-dropper being arranged under each aperture of the slide H.

The shaft I receives rotary motion by means of gear-wheels $e$ $f$, from the axle of the roller A.

Under each seed-dropper is supported a cone, $g$, which serves to scatter the seed.

The driver's seat J is supported upon the frame B, above the roller.

The slide has an arm extending to the seat, so that the driver can readily move the slide to increase or diminish the quantity of seed discharged.

As the roller is moved along over the ground, it will set the seeding-apparatus in motion, and the seed will be scattered on one side while the ground is tilled and rolled on the other side.

By removing the front bolt $b$, the seed-frame E can be swung on the bolt $c$, so as to be brought in rear of the roller, when it is desired to convey the apparatus through narrow gates or doors.

The harrow is elevated when the machine is moving on roads or when otherwise not in use.

Having thus described my invention,

What I claim as new, and desire to secure by Letters Patent, is—

1. A combined seeder, roller, and drag, arranged and operating substantially as herein shown and described.

2. The seed-frame E, when fastened by means of two bolts, $b$ $c$, to the roller-frame, and partly supported on a caster-wheel, so that it can, by removing one bolt, be swung back of the roller, substantially as herein shown and described.

JOHN V. B. FRANCE.

Witnesses:
 JAMES BIRD,
 O. B. SYLVESTER.